(12) United States Patent
Christensen et al.

(10) Patent No.: US 8,329,327 B2
(45) Date of Patent: Dec. 11, 2012

(54) LI-ION BATTERY WITH VARIABLE VOLUME RESERVOIR

(75) Inventors: John F. Christensen, Mountain View, CA (US); Boris Kozinsky, Newton, MA (US); Jasim Ahmed, Mountain View, CA (US); Nalin Chaturvedi, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 839 days.

(21) Appl. No.: 12/437,606

(22) Filed: May 8, 2009

(65) Prior Publication Data
US 2010/0285364 A1 Nov. 11, 2010

(51) Int. Cl.
*H01M 2/12* (2006.01)
*H01M 10/52* (2006.01)

(52) U.S. Cl. .......................................................... 429/66
(58) Field of Classification Search ...................... 429/66
See application file for complete search history.

(56) References Cited

U.S. PATENT DOCUMENTS

| | | | |
|---|---|---|---|
| 6,046,575 A | 4/2000 | Demuro | |
| 6,265,099 B1 | 7/2001 | Gauthier et al. | |
| 6,773,616 B1 | 8/2004 | Chen et al. | |
| 7,029,796 B2 | 4/2006 | Choi et al. | |
| 2004/0214091 A1 | 10/2004 | Lim et al. | |
| 2004/0242804 A1 | 12/2004 | Medsker et al. | |
| 2006/0154141 A1 | 7/2006 | Salot et al. | |
| 2006/0216603 A1 | 9/2006 | Choi | |
| 2007/0042267 A1 | 2/2007 | Kim et al. | |
| 2007/0202400 A1 | 8/2007 | Yoshida et al. | |
| 2007/0212603 A1* | 9/2007 | Nathan et al. | 429/149 |
| 2008/0044732 A1 | 2/2008 | Salot et al. | |
| 2008/0058194 A1 | 3/2008 | Grader et al. | |
| 2008/0153000 A1 | 6/2008 | Salot et al. | |

FOREIGN PATENT DOCUMENTS

| | | |
|---|---|---|
| WO | 2005076389 | 8/2005 |
| WO | 2008002626 | 1/2008 |

OTHER PUBLICATIONS

Christensen, J. and J. Newman, Effect of anode film resistance on the charge/discharge capacity of a lithium-ion battery. Journal of the Electrochemical Society, 2003. 150(11): p. A1416-A1420.
Christensen, J. and J. Newman, Cyclable Lithium and Capacity Loss in Li-Ion Cells. Journal of the Electrochemical Society, 2005. 152(4): p. A818-A829.
Amatucci, G.G. and N. Pereira, Flouride based electrode materials for advanced energy storage devices. Journal of Flourine Chemistry, 2007. 128(4):p. 243-262.
Mikhaylik, Y. Fundamental Chemistry of Sion Power Li/S Battery, in International Battery Association and Hawaii Battery Conference. 2006. Waikoloa, HI.

(Continued)

*Primary Examiner* — Tracy Dove
(74) *Attorney, Agent, or Firm* — Maginot, Moore & Beck

(57) ABSTRACT

An electrochemical cell in one embodiment includes a first electrode, a second electrode spaced apart from the first electrode, a separator positioned between the first electrode and the second electrode, an active material within the second electrode, and a variable volume reservoir in fluid connection with the active material, such that changes in the volume of the active material cause changes in volume of the variable volume reservoir.

13 Claims, 3 Drawing Sheets

OTHER PUBLICATIONS

Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.

Shim, J., K.A. Striebel, and E.J. Cairns, the Lithium/Sulfur Rechargeable Cell. Journal of the Electrochemical Society, 2002. 149: p. A1321.

Doughty, D.H., D.L. Coleman, and M.J. Berry. Abuse Tolerance Studies on Lithium-Sulfur (Li-S) Rechargeable Batteries. in 43rd Power Sources Conference. 2008. Philadelphia, PA.

International Search Report in corresponding PCT application (i.e., PCT/US2010/034037), mailed Jul. 1, 2010 (4 pages).

* cited by examiner

LI-ION BATTERY WITH VARIABLE VOLUME RESERVOIR

Cross-reference is made to U.S. Utility patent application Ser. No. 12/437,576 entitled "Li-ion Battery with Selective Moderating Material" by John F. Christensen et al., which was filed on May 8, 2009; U.S. Utility patent application Ser. No. 12/437,592 entitled "Li-ion Battery with Blended Electrode" by John F. Christensen et al., which was filed on May 8, 2009; U.S. Utility patent application Ser. No. 12/437,622 entitled "Li-ion Battery with Over-charge/Over-discharge Failsafe" by John F. Christensen et al., which was filed on May 8, 2009; U.S. Utility patent application Ser. No. 12/437,643 entitled "System and Method for Pressure Determination in a Li-ion Battery" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,774 entitled "Li-ion Battery with Anode Coating" by John F. Christensen et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Anode" by Boris Kozinsky et al., which was filed on May 8, 2009; U.S. Utility patent application Ser. No. 12/437,873 entitled "Li-ion Battery with Porous Anode Support " by Boris Kozinsky et al., which was filed on May 8, 2009; U.S. Utility patent application Ser. No. 12/463,024 entitled "System and Method for Charging and Discharging a Li-ion Battery" by Nalin Chaturvedi et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

Li/S batteries also have limitations. By way of example, the United States Advanced Battery Consortium has established a goal of >1000 cycles for batteries used in powering an electric vehicle. Li/S batteries, however, exhibit relatively high capacity fade, thereby limiting the useful lifespan of Li/S batteries.

One mechanism which may contribute to capacity fade of Li/S batteries is the manner in which the sulfur reacts with lithium. In general, sulfur reacts with lithium ions during battery discharge to form polysulfides ($Li_xS$), which may be soluble in the electrolyte. These polysulfides react further with lithium (i.e., the value of x increases from ¼ to ⅓ to ½ to 1) until $Li_2S_2$ is formed, which reacts rapidly to form $Li_2S$. In Li/S batteries described in the literature, both $Li_2S_2$ and $Li_2S$ are generally insoluble in the electrolyte. Hence, in a system in which intermediate polysulfides are soluble, each complete cycle consists of soluble-solid phase changes, which may impact the integrity of the composite electrode structure.

Specifically, $Li_2S$ may deposit preferentially near the separator when the current through the depth of the positive electrode is non-uniform. Non-uniformity is particularly problematic at high discharge rates. Any such preferential deposition can block pores of the electrode, putting stress on the electronically conducting matrix and/or isolating an area from the composite electrode. All of these processes may lead to capacity fade or impedance rise in the battery.

Moreover, soluble polysulfides are mobile in the electrolyte and, depending on the type of separator that is used, may diffuse to the negative electrode where the soluble polysulfides may becoming more lithiated through reactions with the lithium electrode. The lithiated polysulfide may then diffuse back through the separator to the positive electrode where some of the lithium is passed to less lithiated polysulfides. This overall shuttle process of lithium from the negative electrode to the positive electrode by polysulfides is a mechanism of self discharge which reduces the cycling efficiency of the battery and which may lead to permanent capacity loss.

Some attempts to mitigate capacity fade of Li/S batteries rely upon immobilization of the sulfur in the positive electrode via a polymer encapsulation or the use of a high-molecular weight solvent system in which polysulfides do not dissolve. In these batteries, the phase change and self-discharge characteristics inherent in the above-described Li/S system are eliminated. These systems have a higher demonstrated cycle life at the expense of high rate capability and capacity utilization.

In the case of a Li/S battery, however, the sulfur active material increases in volume by ~80% as it becomes lithiated during battery discharge. Thus, an all solid-state cathode, composed of sulfur (or lithiated sulfur) and a mixed conducting material, particularly if the latter is a ceramic, is susceptible to fracture due to the volume change upon battery cycling. Fracture of the cathode can result in capacity fade and is a potential safety hazard if it causes the separator to crack as well, possibly resulting in an internal short. Other materials which exhibit desired capabilities when incorporated into a battery also exhibit significant increases in volume. By way of example, LiSi, typically used as an anode material, exhibits a large increase in volume during operation.

What is needed therefore is a battery that provides the benefits of materials that exhibit large volume changes during operation of the cell while reducing the likelihood of fracture of material within the cell.

SUMMARY

In accordance with one embodiment, an electrochemical cell includes a first electrode, a second electrode spaced apart from the first electrode, a separator positioned between the first electrode and the second electrode, an active material within the second electrode, and a variable volume reservoir in fluid connection with the active material, such that changes in the volume of the active material cause changes in volume of the variable volume reservoir.

In accordance with another embodiment, an electrochemical cell includes a first electrode, a second electrode spaced apart from the first electrode, the second electrode including a plurality of active material particles, a separator positioned between the first electrode and the second electrode, and at least one first variable volume reservoir in fluid connection with the plurality of active material particles, such that changes in the volume of the plurality of active material particles cause changes in volume of the at least one first variable volume reservoir.

DESCRIPTION

Figure 1:
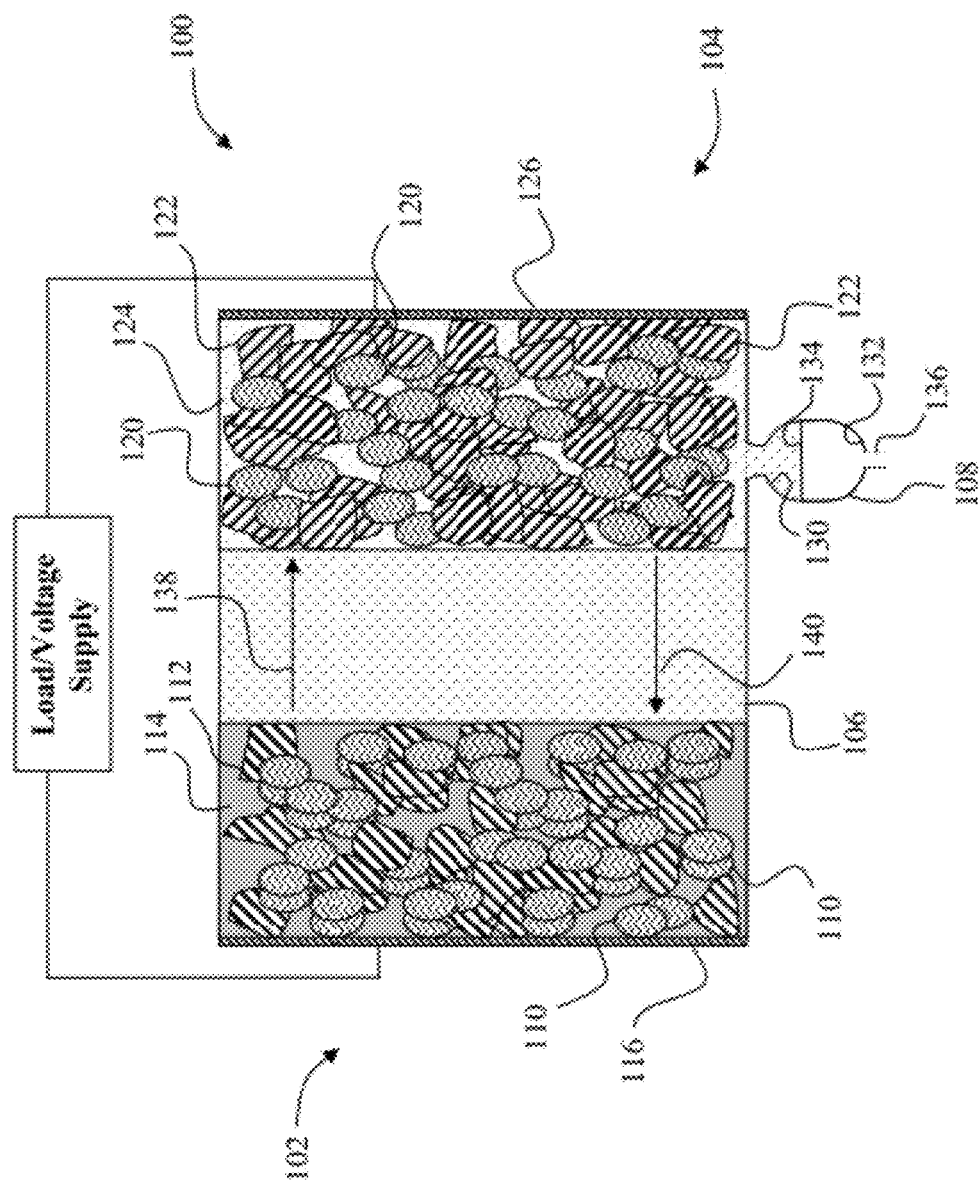
FIG. 1 depicts a schematic of a battery system including an electrochemical cell with one electrode including a material that exhibits significant volume changes as the electrochemical cell cycles and a variable volume reservoir located outside of the electrode and in fluid connection with the electrode.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion cell 100, which includes a negative electrode 102, a positive electrode 104, and a separator region 106 between the negative electrode 102 and the positive electrode 104. An expansion reservoir 108 is in fluid communication with the positive electrode 104. The negative electrode 102 includes active materials 110 into which lithium can be inserted, inert materials 112, electrolyte 114 and a current collector 116.

The negative electrode 102 may be provided in various alternative forms. The negative electrode 102 may incorporate dense Li metal or a conventional porous composite electrode (e.g., graphite particles mixed with binder). Incorporation of Li metal is desired since the Li metal affords a higher specific energy than graphite.

The separator region 106 includes an electrolyte with a lithium cation and serves as a physical and electrical barrier between the negative electrode 102 and the positive electrode 104 so that the electrodes are not electronically connected within the cell 100 while allowing transfer of lithium ions between the negative electrode 102 and the positive electrode 104.

The positive electrode 104 includes active material 120 into which lithium can be inserted, a mixed conducting material 122, fluid 124, and a current collector 126. The active material 120 includes a form of sulfur and may be entirely sulfur. The mixed conducting material 122 conducts both electrons and lithium ions and is well connected to the separator 106, the active material 120, and the collector 126. The fluid 124, which may be a liquid or a gas, is relatively inert with respect to the other components of the positive electrode 104. Gases which may be used, depending upon the particular chemistry of the cell, include argon or nitrogen. The fluid 124 fills the interstitial spaces between the active material 120 and the mixed conducting material 122.

The fluid 124 is in fluid communication with the expansion reservoir 108. The expansion reservoir 108 includes a first chamber 130 into which the fluid 124 may flow and a second chamber 132 which is separated from the chamber 130 by an elastic membrane 134. The second chamber 132 is open to the atmosphere through a vent 136.

The lithium-ion cell 100 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the negative electrode 102 during discharging and an equal amount of electrons are consumed at the positive electrode 104 as lithium and electrons move in the direction of the arrow 138 of FIG. 1.

In the ideal discharging of the cell 100, the electrons are generated at the negative electrode 102 because there is extraction via oxidation of lithium ions from the active material 110 of the negative electrode 102, and the electrons are consumed at the positive electrode 104 because there is reduction of lithium ions into the active material 120 of the positive electrode 104. During discharging, the reactions are reversed, with lithium and electrons moving in the direction of the arrow 140.

Figure 2:
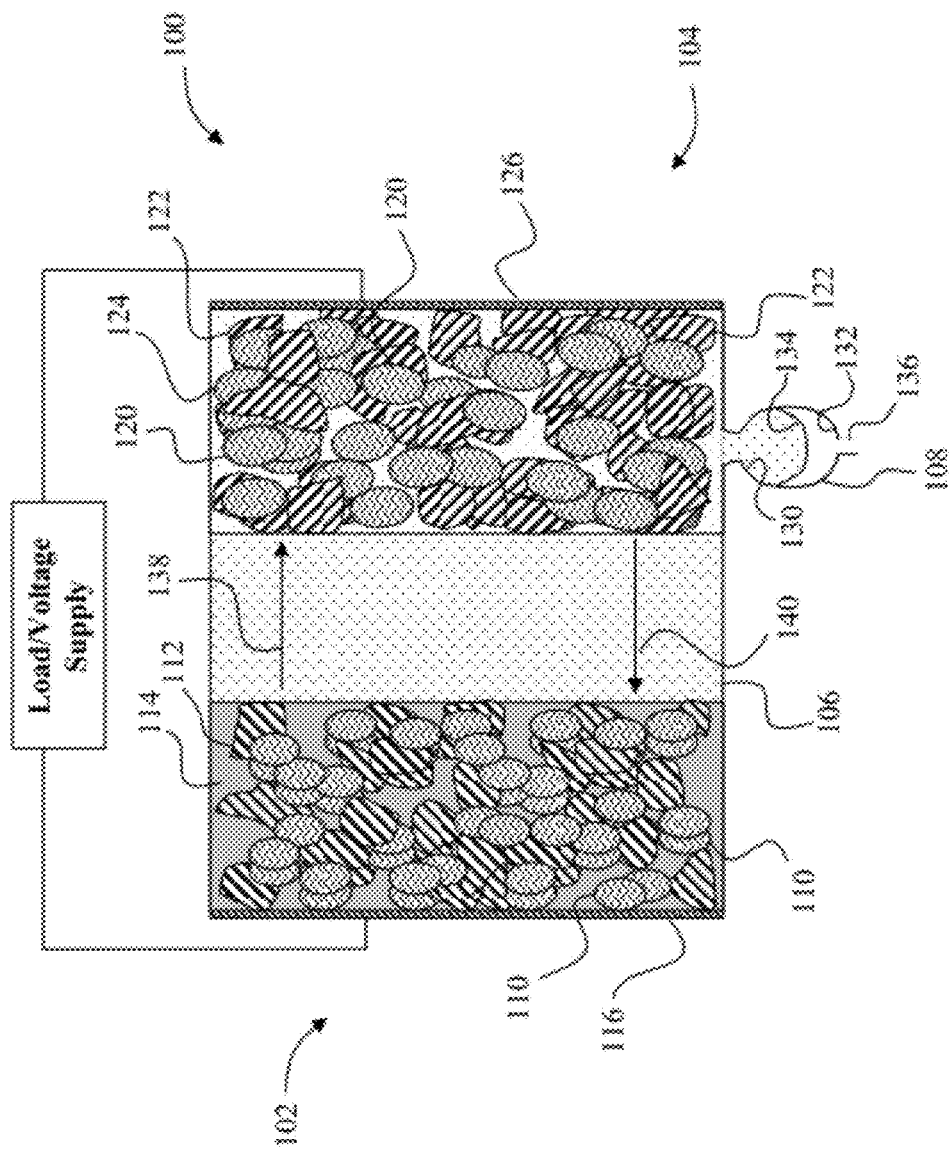
FIG. 2 depicts a schematic of the battery system of FIG. 1 after a significant increase in the volume of the material that exhibits significant volume changes has occurred showing a change in the volume of the reservoir as fluid from the electrode flows into the reservoir.

As lithium is reduced into the active material 120, the volume of the active material 120 increases. This is depicted in FIG. 2 by the increased size of the individual particles of active material 120 compared to the size of the individual particles of active material 120 in the FIG. 1.

As the volume of the active material 120 increases, the pressure within the positive electrode 104 increases, thereby increasing the pressure within the chamber 130. The pressure in the chamber 132, however, does not change. Accordingly, a force is applied to the elastic membrane 134, causing distortion of the membrane 134 from the condition depicted in FIG. 1 to the condition depicted in FIG. 2. As the membrane 134 is resiliently deformed, the pressure within the chamber 132 does not change since the chamber 132 is vented to atmosphere through the vent 136. The volume of the chamber 132, however, decreases.

Accordingly, the chamber 130, the chamber 132, and the resilient membrane 134 provide a reservoir with a variable volume. Flow of the fluid 124 into the chamber 130 thus moderates pressure increases within the electrode 104. The amount of pressure increase which occurs within the electrode 104 is a matter of design choice. For example, as the stiffness of the membrane 134 increases, a higher pressure within the electrode 104 is needed to achieve the same deformation of the membrane 134.

If desired, more than one expansion reservoir 108 may be provided with membranes of the same or differing stiffness. Additionally, in embodiments incorporating volume changing material in the negative anode 102, additional reservoirs may be provided in fluid communication with the negative anode 102. By way of example, embodiments incorporating large volume increasing materials in the negative anode 102, such as other forms of lithium including, but not limited to, LiSn, LiSnCoC, LiSnSb, LiAl, LiMg, and others, may be provided with a reservoir directly connected to the negative anode 102.

Figure 3:
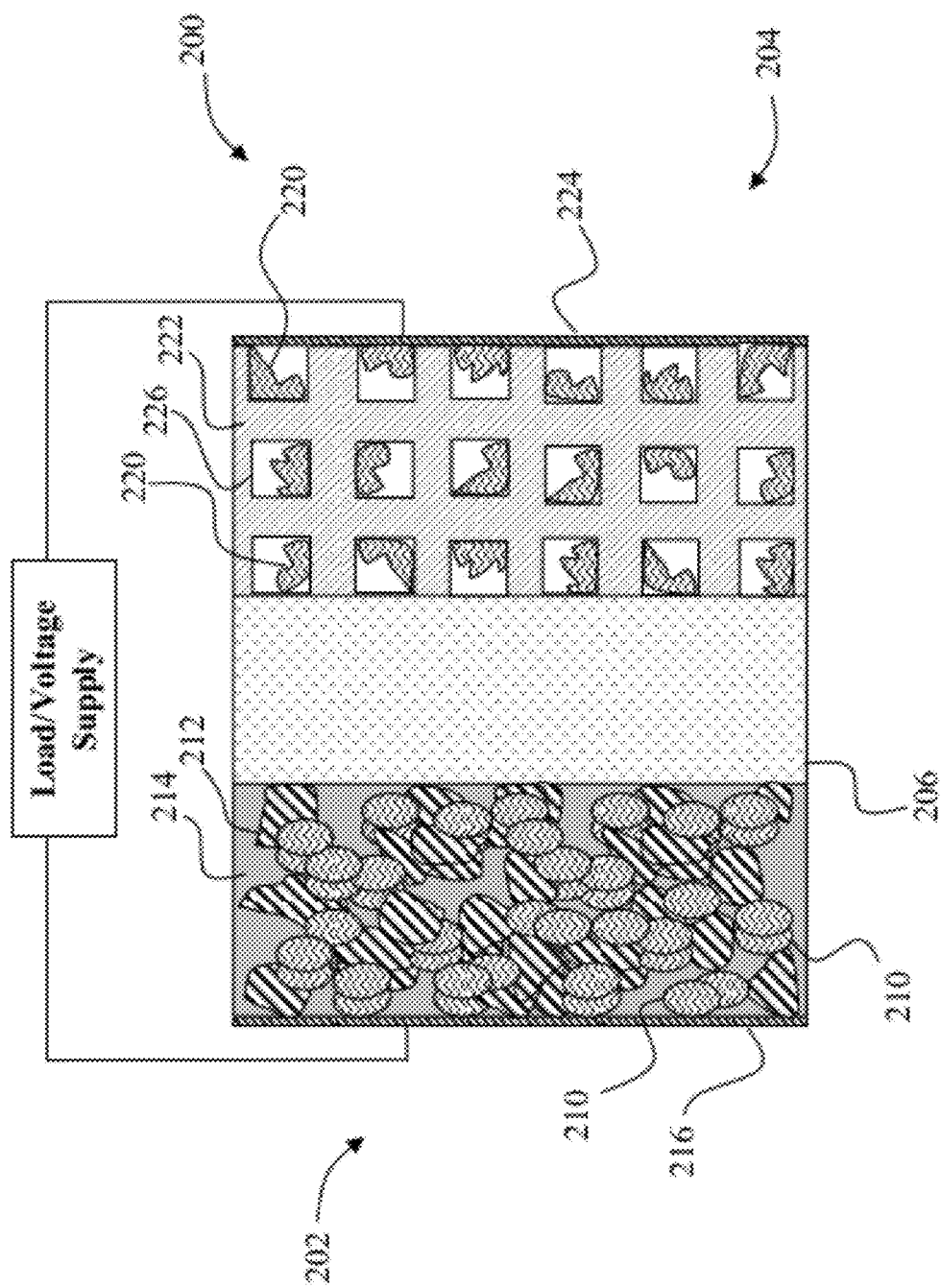
FIG. 3 depicts a schematic of a battery system including an electrochemical cell with one electrode including a material that exhibits significant volume changes as the electrochemical cell cycles and a variable volume reservoir located inside of the electrode and in fluid connection with the volume changing material.

Moreover, reservoirs need not be located external to the electrode. One embodiment with internal reservoirs is depicted in FIG. 3. FIG. 3 depicts a lithium-ion cell 200, which includes a negative electrode 202, a positive electrode 204, and a separator region 206 between the negative electrode 202 and the positive electrode 204. The negative electrode 202 includes active materials 210 into which lithium can be inserted, inert materials 212, electrolyte 214 and a current collector 216.

The separator region 206 includes an electrolyte with a lithium cation and serves as a physical and electrical barrier between the negative electrode 202 and the positive electrode 204 so that the electrodes are not electronically connected within the cell 200 while allowing transfer of lithium ions between the negative electrode 202 and the positive electrode 204.

The positive electrode 204 includes active material 220 into which lithium can be inserted, a mixed conducting material 222, and a current collector 224. The active material 220 includes a form of sulfur and may be entirely sulfur. The mixed conducting material 222 conducts both electrons and lithium ions and is well connected to the separator 206, the active material 220, and the collector 224.

In the embodiment of FIG. 3, each portion of the active material 220 is in direct fluid connection with a variable volume reservoir 226. The variable volume reservoirs 226 may be filled with a material that is relatively inert with respect to the other components of the positive electrode 204. The material within the reservoir 226 is isolated from the atmosphere in this embodiment.

Operation of the cell 200 is similar to the operation of the cell 100 described above. The main difference is that as the volume of the active material 220 increases, the active material 220 flows or expands into the variable volume reservoirs 226. To ensure the active material 220 expands into the variable volume reservoirs 226 rather than deforming mixed conducting material 222, the mixed conducting material 222 is selected to be a material that is more rigid than the material, if any, within the variable volume reservoirs 226. For example, the variable volume reservoirs 226 may be filled with a compressible inert gas such as nitrogen or argon. Alternatively, the variable volume reservoirs 226 may be filled with an elastomer. In a further embodiment, the variable volume reservoirs are evacuated of material.

Accordingly, as the volume of the active material 220 increases, the active material expands into the variable volume reservoirs 226, reducing the volume of the reservoirs 226. Accordingly, stress within the cell 200 is borne primarily by the reservoirs 226, although the mixed conducting material 222, depending upon the embodiment, may be subjected to some amount of increased pressure.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical cell, comprising:
   a first electrode;
   a second electrode spaced apart from the first electrode;
   a separator positioned between the first electrode and the second electrode;
   an active material within the second electrode; and
   a variable volume reservoir located external to the second electrode and in fluid connection with the active material, such that changes in the volume of the active material cause changes in volume of the variable volume reservoir, and such that changes in the volume of the active material cause a fluid in contact with the active material and in fluid contact with the variable volume reservoir to move into or out of the variable volume reservoir.

2. The electrochemical cell of claim 1, wherein the second electrode is a positive electrode.

3. The electrochemical cell of claim 2, wherein the active material comprises a form of sulfur.

4. The electrochemical cell of claim 3, further comprising:
   a mixed conductor in the second electrode and connected to the separator and the active material within the second electrode for transfer of electrons and lithium ions for transfer of electrons and lithium ions.

5. The electrochemical cell of claim 1, wherein the first electrode is a negative electrode.

6. The electrochemical cell of claim 5, wherein the active material comprises a form of lithium.

7. The electrochemical cell of claim 1, wherein the fluid is a gas.

8. The electrochemical cell of claim 1, wherein the variable volume reservoir comprises:
   a resilient membrane in contact with the fluid.

9. An electrochemical cell, comprising:
   a first electrode;
   a second electrode spaced apart from the first electrode, the second electrode including a plurality of active material particles;
   a separator positioned between the first electrode and the second electrode; and
   at least one first variable volume reservoir including a first compressible elastomer in fluid connection with the plurality of active material particles, such that changes in the volume of the plurality of active material particles cause changes in volume of the first compressible elastomer of the at least one first variable volume reservoir.

10. The electrochemical cell of claim 9, further comprising:
a mixed conductor in the second electrode and connected to the separator and to each of the plurality of active material particles for transfer of electrons and lithium ions.

11. The electrochemical cell of claim 9, further comprising:
a second variable volume reservoir including a second compressible elastomer in fluid connection with the first electrode, such that changes in the volume of a component of the first electrode causes changes in volume of the second compressible elastomer of the second variable volume reservoir.

12. The electrochemical cell of claim 9, wherein the at least one first variable volume reservoir comprises:
a plurality of first variable volume reservoirs.

13. The electrochemical cell of claim 12, wherein each of the plurality of first variable volume reservoirs is located within the second electrode.

* * * * *